United States Patent [19]
Corwin et al.

[11] 3,870,838
[45] Mar. 11, 1975

[54] MEANS AND APPARATUS FOR FAULT LOCATING PULSE REGENERATORS

[75] Inventors: Walter Leo Corwin, Freehold; Robert Emerson Keeler, Colts Neck; Philip Edward Rubin, Madison Township, Middlesex County, all of N.J.

[73] Assignee: Bell Telephone Laboratories, Incorporated, Murray Hill, N.J.

[22] Filed: Mar. 11, 1974

[21] Appl. No.: 450,170

[52] U.S. Cl. .......................... 179/175.31 R, 328/59
[51] Int. Cl. .......................................... H04b 3/46
[58] Field of Search ............ 179/175.31 R, 175.3 R; 328/59, 63

[56] References Cited

UNITED STATES PATENTS

| | | | |
|---|---|---|---|
| 3,062,927 | 11/1962 | Hamori | 179/175.31 R |
| 3,083,270 | 3/1963 | Mayo | 179/175.31 R |
| 3,725,677 | 4/1973 | Lawlor | 328/59 |

*Primary Examiner*—Kathleen H. Claffy
*Assistant Examiner*—Douglas W. Olms
*Attorney, Agent, or Firm*—Daniel D. Dubosky

[57] ABSTRACT

In order to locate a faulty pulse regenerator in a transmission system, random streams of test pulses having predetermined statistical variations are transmitted along the transmission system. By slowly varying the mean of a noise signal applied to a decision circuit which generates a first test pulse level when the noise voltage is above threshold and a second test pulse level when the noise voltage is below the threshold, a predetermined amplitude characteristic at the frequency at which the mean of the noise is varied can be imposed upon the distribution of test pulse levels generated by the decision circuit. A regenerator can be determined to be operative or faulty by comparing, at the frequency of the variation of the mean of the noise, the time-varying average signal derived from the regenerated test pulse stream with an anticipated signal.

6 Claims, 7 Drawing Figures

OUTPUT LOWPASS FILTER

OUTPUT BANDPASS FILTER

MEANS AND APPARATUS FOR FAULT LOCATING PULSE REGENERATORS

BACKGROUND OF THE INVENTION

This invention relates to the generation of a pulse test sequence for use in locating a faulty pulse regenerator in a digital transmission system.

Digital transmission systems generally require pulse regenerators spaced along the transmission path to regenerate each pulse in the transmitted signal. At each clock instant, the regenerators regenerate the pulse for further transmission by comparing the level of the received pulse with a threshold value to decide the most likely transmitted pulse. Operative regenerators perform successfully at very low error rates. However, as the regenerator circuits become increasingly susceptible to circuit noise, the error rate increases such that the regenerator incorrectly decides what the received pulse signals are. Thus, to insure system reliability, faulty regenerators must be detected and replaced. Although a faulty transmission line can be detected, it is difficult to determine the specific regenerator causing the decision errors. Since the regenerators are located in manholes spaced along the transmission path, direct access to the regenerator circuits for testing is impractical.

In order to test and identify a faulty regenerator, a test sequence of pulses can be generated at the transmitting terminal and transmitted on the transmission path to all the regenerators to derive responses therefrom. A faulty regenerator can thus be detected by comparing the responses of each regenerator to the test sequences with predicted responses.

In the prior art, test sequences having a fixed pattern of pulses are chosen such that the response of a faulty regenerator will significantly deviate from an expected response. When the regenerators in the transmission system are stressed by transmitting a test pulse sequence in which one pulse polarity occurs more frequently than another, the regenerators are deleteriously affected by increasing the susceptibility of each regenerator to circuit noise with a corresponding increase in the probability that the decision circuits in the regenerators will incorrectly decide what the received pulse is. Furthermore, the errors are more likely to be in a direction to reduce the stressing. Therefore, whereas an operative regenerator will continue to regenerate each pulse in the stressed test pulse stream without noticeable degradation, a faulty regenerator will generate many errors.

When a fixed polar binary test pulse stream which alternates between only two levels is transmitted along the transmission path, the average value output of each operative regenerator will be linearly related to the proportion of occurrence of each level. By stressing a polar binary pulse stream so that the proportion of pulses at one level is greater than the proportion of pulses at the other, the average value of the test signal will approach the pulse level having the greater proportion. Since, however, a faulty regenerator will regenerate many of the received more-frequently occurring levels as the second less frequently occurring levels, the relationship between the average value output of a faulty regenerator and the proportion of each level in the test pulse sequence will not be linear. Thus, a faulty regenerator can be detected by comparing the average output of each regenerator with an anticipated output determined by the proportion of each pulse level in the test pulse sequence.

Such prior art testing schemes transmit fixed digital words along the transmission system to each regenerator, the fixed digital words being alternated at an audio rate keyed to a particular regenerator connected in the transmission path. The output of each regenerator is then filtered at its appropriate keyed frequency and the resultant output retransmitted back to a detector at the transmitting terminal of the transmission system. It can then be determined whether the regenerator under test is operative or faulty by comparing the filtered output signal from the regenerator under test with an anticipated value. Each regenerator is sequentially tested by varying the rate of occurrence of the fixed digital test words. Since, however, the prior art test pulse sequences tested the regenerators with the same fixed pattern of pulses, the response of certain regenerators to some fixed test sequences could produce anomalous results, wherein a faulty regenerator could test operative.

An object of this invention is to improve systems for the remote stress testing of pulse regenerators in pulse transmission systems and more particularly to reduce the likelihood of obtaining the anomalous results which occurred in previous test systems.

SUMMARY OF THE INVENTION

In accordance with the present invention, a random test pulse stream is transmitted along the transmission path to the regenerators to be tested. The random test pulse signal is generated by applying the output voltage of a noise source to a decision circuit which, in response to clock pulses, produces at its output a first test pulse level for transmission when the noise voltage at a clock pulse instant is above a threshold, and a second test pulse level when the noise voltage at a clock pulse instant is below the threshold. In order to deleteriously affect the operation of the regenerator under test, the rate of occurrence of one test pulse level is increased relative to the other. Since the probability of the noise voltage being above or below the threshold level is dependent upon the probability distribution of the noise voltage at the input to the decision circuit at each clock instant, the distribution of output test pulse levels can be varied by varying the mean of the noise voltage applied to the decision circuit. By varying with a predetermined amplitude characteristic and frequency the mean of the noise voltage applied to the decision circuit in response to an externally applied slowly varying stressing signal, the amplitude variations and frequency of the stressing signal can be imposed upon the distribution of the test pulse levels transmitted over the transmission system. A regenerator can be determined to be operative or faulty by comparing, at the frequency of the stressing signal, the time-varying average signal derived from the regenerated test pulse stream with an anticipated signal. By varying the frequency of the stressing signal, a particular one of plural tandem regenerators can be selected for testing.

DETAILED DESCRIPTION

Figure 1:
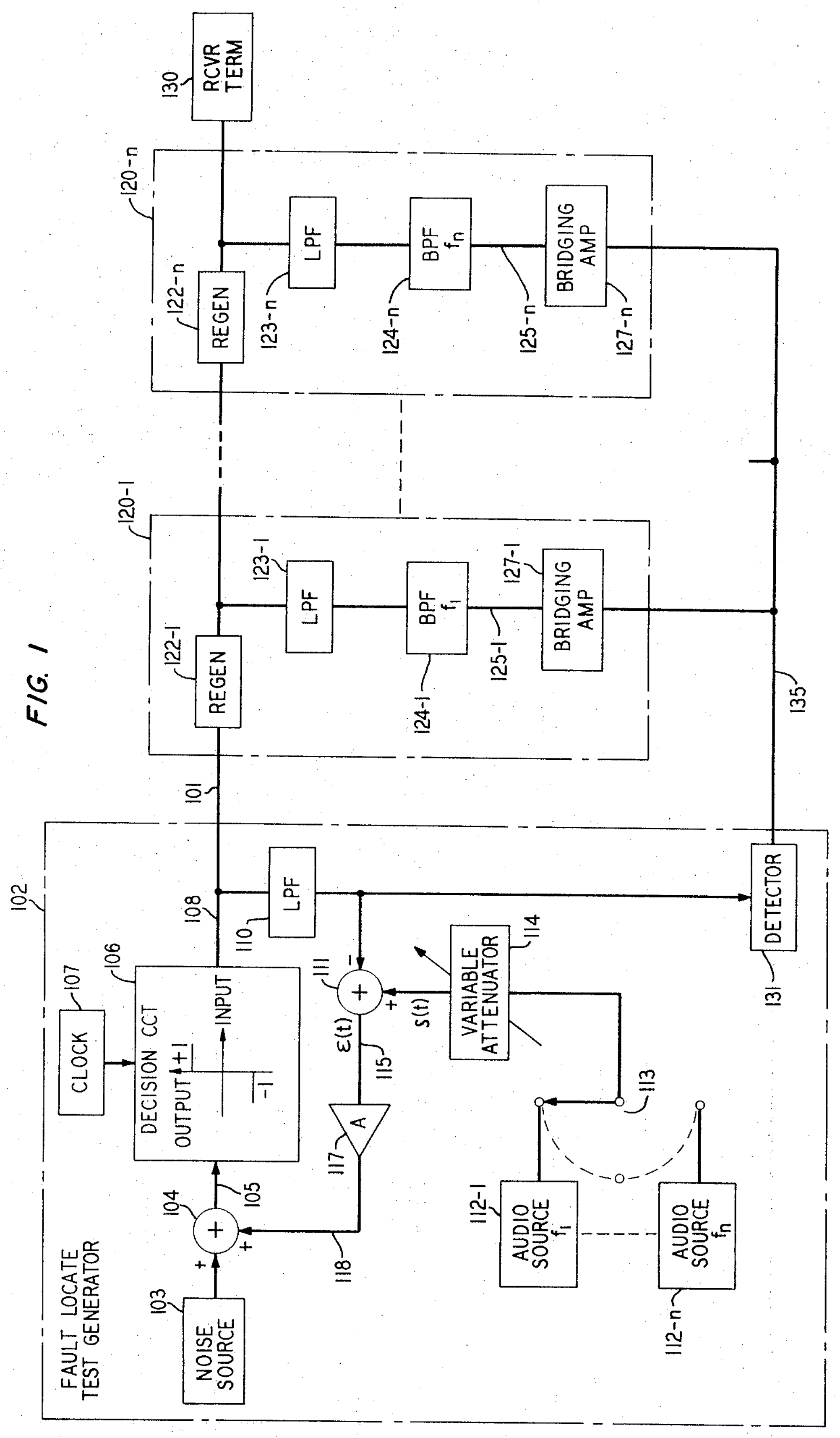
FIG. 1 illustrates a transmission system employing an embodiment of the present invention.

An embodiment of a fault locate test generator employing the present invention is illustrated in FIG. 1. By generating and transmitting a sequence of test pulses over a transmission line 101, the fault locate test set 102 can be used to locate a faulty regenerator connected along transmission line 101 which extends through plural tandem connected regenerators 122–1 through **122–*n* to a receiver terminal 130**.

Figure 2A:
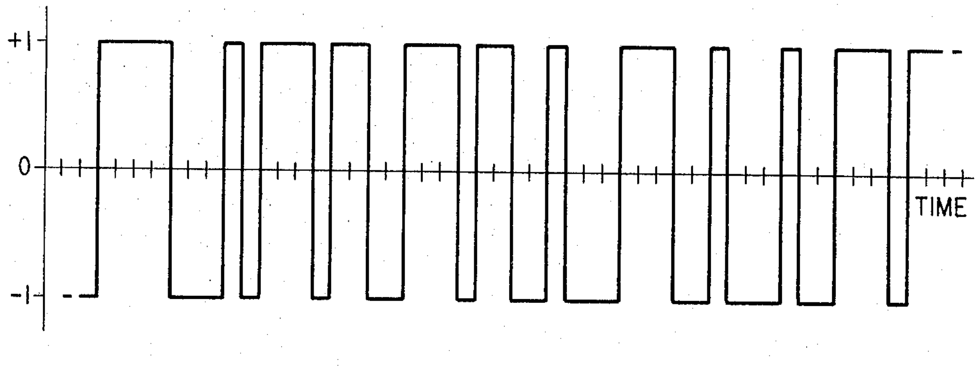
FIG. 2A is a portion of an illustrative polar binary test pulse stream transmitted on the transmission system of FIG. 1.

In accordance with the present invention, stochastic pulse test sequences having random variations are generated by fault locate test generator 102. A noise source 103 having a uniform frequency characteristic across the frequency band of interest generates a noise signal at its output terminal. It will be assumed that the voltage mean of noise source 103 is zero and the probability density function of the voltage magnitude is Gaussian. In a manner to be discussed hereinafter, the mean of the noise source 103 is slowly varied in a predetermined manner by combining the noise voltage at the output of noise source 103 with a signal derived in a feedback loop. A signal combiner 104 adds the time varying signal derived in the feedback loop to the noise voltage from noise source 103 to produce at terminal 105 a noise signal having a slowly varying mean. Output terminal 105 of signal combiner 104 is connected to a decision circuit 106. A clock circuit 107 applies clock pulses to decision circuit 106 which, at each clock instant, compares the noise voltage at its input terminal 105 with a threshold of zero. A polar binary signal is generated at output terminal 108 of decision circuit 106 having an output level of +1 when the noise voltage at terminal 105 is greater than zero at a clock instant, and an output level of −1 when the noise voltage at input terminal 105 is less than zero at a clock instant. Decision circuit 106 may be one of several well-known networks, as for example, the strobed comparator illustrated in "High Speed A/D Converter Monolithic Technique", page 147, by D. R. Brever in the 1972 *IEEE International Solid-State Circuits Conference Digest of Technical Papers.* As illustrated in FIG. 2A, therefore, the output signal of decision circuit 106 on output terminal 108 will alternate between +1 and −1 with the probability of the occurrence of each level determined by the mean of the noise on terminal 105. Thus, with reference again to FIG. 1, as the mean of the noise voltage on terminal 105 increases in the positive direction, the probability of the noise voltage being above zero at a clock instant increases toward one. Therefore, as the mean of the noise voltage at terminal 105 increases, the rate of occurrence of the +1 level on output terminal 108 increases, and the rate of occurrence of the −1 level on output terminal 108 decreases. The rates of occurrence of the +1 and −1 levels are thus dependent upon the magnitude of the feedback signal applied to signal combiner 104. Furthermore, since the mean of the noise voltage at terminal 105 is slowly varying as compared with the clock frequency of clock circuit 107, the successive levels generated by decision circuit 106 can be assumed to be relatively uncorrelated.

In accordance with the present invention, the mean of the noise at input terminal 105 will be varied in such a manner as to produce at the output of decision circuit 106 a signal in which the slowly varying time-dependent probabilities of +1 and −1 levels follow a preselected pattern. In particular, the pulse stream generated by decision circuit 106 will be stressed, where stress is to be defined hereinafter as the absolute difference between the probability of a +1 and the probability of a −1, such that the probabilities of +1 and −1 levels at output terminal 108 vary sinusoidally. Since it has been found that a sinusoidal variation will produce consistent responses from regenerator to regenerator in the transmission system, sinusoidal stressing is a preferred embodiment. The present invention is not, however, limited to the generation of a pulse test sequence that is sinusoidally stressed since the variation in the output probabilities of the +1 and −1 levels could be adjusted to follow any preselected amplitude variation. Furthermore, the rate of variation of the probabilities of the +1 and −1 levels at the output of decision circuit 108 is at an audio rate which is substantially below the frequency of clock circuit 107. Therefore, the magnitude of the average output of decision circuit 106 on terminal 108 will also vary sinusoidally at the same audio rate and proportional to the stressing of the pulse stream.

A sinusoidal variation in the mean of the noise at terminal 105, however, will not vary the probabilities of occurrence of the levels on terminal 108 sinusoidally since the mean of the input Gaussian noise is not linearly related to the probability of the noise being above or below a fixed threshold. The embodiment of the present invention illustrated in FIG. 1 employs a feedback loop to maintain a linear relationship between an externally applied stressing signal and the output probabilities.

The output of decision circuit 106 is connected to a lowpass filter 110 having a cut-off above the audio band. Lowpass filter 110 removes the high frequency components from the polar binary pulse signal on output terminal 108 of decision circuit 106 and produces a signal equal to the average value of the signal generated by decision circuit 106. Thus, if decision circuit 106 is unstressed such that the mean of the noise voltage on terminal 105 is zero and the probabilities of +1 and −1 levels are equal, the output of lowpass filter 110 will be zero.

The output of lowpass filter 110 is applied to a negative input of a combining circuit 111. A time-varying stressing signal, $s(t)$ having the desired frequency and amplitude variations of the output probabilities, is applied to a positive input of combining circuit 111. The frequency of the stressing signal $s(t)$ is determined by connecting switch 113 to one of $n$ audio sources 112–1 through **112–*n*. Audio sources 112–1 through 112–*n* each generate a signal having the same shape at different frequencies, wherein the shape determines the amplitude variations of the stressing signal $s(t)$. Variable attenuator 114 is connected between the input of signal combiner 111 and the audio source 112–1 through 112–n to which switch 113 is connected. The magnitude of the stressing signal $s(t)$ applied to the feedback loop through signal combiner 111 is thus determined by the adjustment of variable attenuator 114. Each regenerator connected along transmission path 101 may be selectively tested, in a manner to be discussed hereinafter, by connecting switch contact 113 to the one of audio frequency sources 112–1 through 112–n** at the frequency of which the repeater under test is made uniquely responsive, thus producing a stochastic test pulse sequence with sinusoidal stressing signals of a frequency individual to the particular regenerator.

If it is assumed that the stressing signal $s(t)$ applied to signal combiner 111 has a zero magnitude, then the output of lowpass filter 110 is also equal to zero since the average value at the output of decision circuit 106 is zero when a +1 and a −1 are equiprobable. If, however, decision circuit 106 starts to produce more +1*s* than −1*s* due to either a skewing of noise source 103 or a drift in the threshold of decision circuit 106, the output of lowpass filter 110 increases above zero and a signal $\epsilon(t)$ at the output of signal combiner 111 on terminal 115 decreases below zero. When the negative signal $\epsilon(t)$ is amplified by amplifier 117 and added by signal combiner 104 to the noise voltage generated by noise source 103, the mean of the noise voltage at terminal 105 decreases. The decision circuit 106 will then produce an equal number of +1 and −1 levels and tend to drive the output of lowpass filter 110 back to zero. Thus, in the absence of a stressing signal, the feedback loop comprising lowpass filter 110, signal combiner 111 and amplifier 117 tends to keep the probabilities of +1 and −1 levels at the output of decision circuit 106 equal. A positive stressing signal $s(t)$ when applied to signal combiner 111 and combined with the output of lowpass filter 110 generates a positive signal $\epsilon(t)$ on terminal 115. Thus, when $\epsilon(t)$ is amplified and applied to signal combiner 104, the mean of the noise voltage at terminal 105 will be greater than zero and the probability of a +1 level at the output of decision circuit 106 will increase, also increasing the average value of the output of decision circuit 106. It can be shown that when a time varying stressing signal $s(t)$ is applied to signal combiner 111 in the feedback loop, the probabilities of +1 and −1 levels, and thus also the average value at the output of decision circuit 106, will have the same amplitude variations and frequency of $s(t)$. The output of lowpass filter 110 representing the average value of the output of decision circuit 106 is thus driven towards the externally applied stressing signal $s(t)$.

Figure 2B:
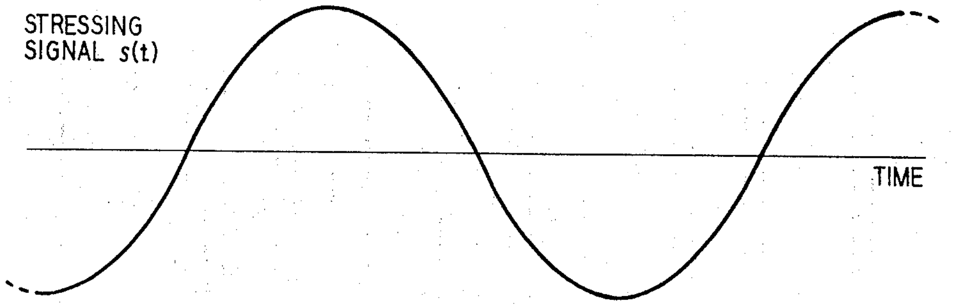
FIG. 2B is an illustrative sinusoidal stressing signal used to vary the mean of the noise voltage applied to a decision circuit.

The time and amplitude variations of the sinusoidal stressing signal $s(t)$ applied to a signal combiner 111 are illustrated in FIG. 2B. The maximum amplitude of the stressing signal $s(t)$ is dependent upon the maximum stress to be impressed upon the pulse stream at the output of decision circuit 106, the gain of amplifier 117, and the root-mean-square output of noise source 103. Thus, at each time instant when the peak of the stress signal $s(t)$ is applied to signal combiner 111, the mean of the noise voltage at terminal 105 should be shifted such that the absolute difference between the probability that decision circuit 106 will generate a +1 and a −1 in response to the applied noise voltage is the desired stress amplitude.

In order to illustrate the relative time bases between the output pulses generated by decision circuit 106 as shown in FIG. 2A and the stressing signal $s(t)$ as shown in FIG. 2B, the repetition rate of the clock circuit can be assumed to be approximately 300 megabits per second and the order frequency of $s(t)$ can be assumed to be 3 kHz. Therefore, 100 kilobits would be generated by decision circuit 106 per stressing cycle. Thus, as the stressing signal $s(t)$ sinusoidally increases and decreases imposing a variation in the mean of the noise voltage at terminal 105, the rate of occurrence of the +1 and −1 levels at the output of decision circuit 106 will vary proportionally with the amplitude characteristics of $s(t)$. Accordingly, at the zero crossing times of $s(t)$, the probability of a +1 and a −1 being generated by decision circuit 106 are equal and approximately an equal number of +1*s* and −1*s* will appear at the pulse stream at the output of decision circuit 106. As the mean of the noise voltage increases towards its maximum, the probability of a +1 level being generated is greater than the probability of a −1 level being generated. Thus, the rate of occurrence of the +1 level at the output of decision circuit 106 will be greater than the rate of occurrence of the −1 level. Similarly, when $s(t)$ is negative, imposing a negative mean on the noise voltage at terminal 105, the probability of a −1 level being generated is greater than the probability of a +1 level, and the rate of occurrence of the −1 level is greater than the rate of occurrence of the +1 level.

Figure 2C:
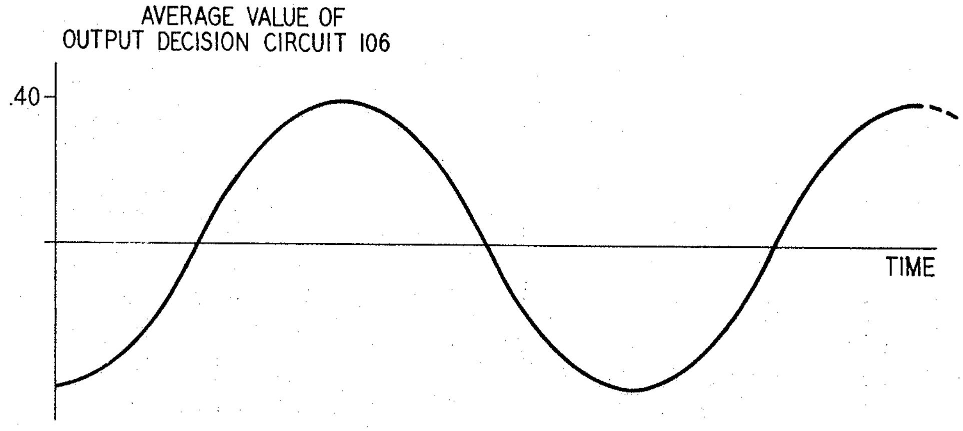
FIG. 2C is the time-varying average of a test pulse stream generated in response to the stressing signal of FIG. 2B.

As aforenoted, the stressing of the pulse stream at the output of decision circuit 106 varies in accordance with the amplitude variations of $s(t)$. Therefore, the average value of the output of decision circuit 106 as determined by the output of lowpass filter 110 will follow similar amplitude variations. FIG. 2C illustrates the output of lowpass filter 110 when the pulse stream is stressed so that the maximum absolute difference between the probability of a +1 and the probability of a −1 is 0.4. Thus, as illustrated in FIG. 2C, the maximum time-varying average value output of lowpass filter 110 will be 0.4.

Figure 2D:
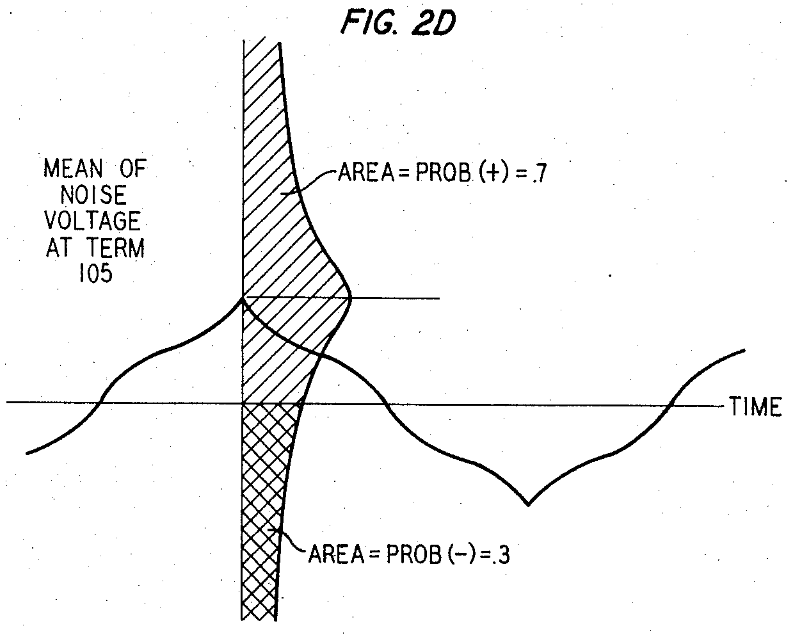
FIG. 2D illustrates the variations in the mean of the noise voltage applied to the decision circuit in response to the stressing signal of FIG. 2B.

As aforenoted, due to the nonlinearity of the Gaussian probability density function, the amplitude variation in the stress of the output pulse stream at the output of the decision circuit is not linearly related to the variation in the mean of the noise voltage applied to decision circuit 106 on terminal 105. FIG. 2D illustrates the amplitude variations that the mean of the noise voltage applied to decision circuit 106 follows in response to the sinusoidal stressing signal $s(t)$, so that the pulse stream at the output of decision circuit 106 is sinusoidally stressed. A representation of the Gaussian probability density function at the maximum peak amplitude of the time varying mean is superimposed upon the mean variation curve in FIG. 2D. Thus, for the illustrative stressing of 0.4, the hatched area under the Gaussian curve above the zero threshold, representing the probability that decision circuit 106 will generate a +1 level, is 0.7. Similarly, the cross-hatched area under the Gaussian curve below the zero threshold, representing the probability that the decision circuit 106 will generate a −1 level, is 0.3.

With reference again to FIG. 1, in order to test one of the *n* regenerators 122–1 through 122–n connected along transmission path 101 in manhole locations 120–1 through 120–n, respectively, switch 113 is connected to the audio source 112–1 through 112–n having a frequency which, as will be explained hereinafter, the regenerator under test is responsive. Variable attenuation 114 is adjusted so that $s(t)$ has an appropriate magnitude to stress the pulse stream at the output of decision circuit 106 to the desired maximum amplitude. In practice, variable attenuator 114 will be sequentially adjusted at each setting of switch 113 in order to examine the response of the regenerator under test to several maximum stressing levels. Fault locate test generator 102 thus transmits a random test pulse sequence of levels over transmission line 101 to regenerators 122-1 through **122-*n* connected between the transmitter and receiver terminal 130 wherein the rate of occurrence of the +1 and −1 levels sinusoidally vary at the one frequency $f_1$ through $f_n$ of the audio sources 112-1 through 112-*n*, to which switch 113** is connected.

Associated with each regenerator 122 is a branch circuit including in tandem a lowpass filter 123, a bandpass filter 124 and a bridging amplifier 127. The branch circuits are connected back to a detector 131 at the test location through a line 135.

Lowpass filters 123-1 through **123-*n* having cut-off frequencies above the audio band are connected, respectively, to the output of each line regenerator 122-1 through 122-*n* to remove the high frequency components from the test pulse streams regenerated by the associated regenerator and to form an output equal to the time-varying average output of the associated regenerator. Bandpass filters 124-1 through 124-*n* are connected to the outputs of lowpass filter 123-1 through 123-*n* respectively. Bandpass filters 124-1 through 124-*n* each have a narrow pass band centered respectively around one of frequency $f_1$ through $f_n$ of audio sources 112-1 through 112-*n*. Therefore, only the component of the output of each lowpass filter 123-1 through 123-*n* at the center frequency, $f_1$ through $f_n$, of the connected bandpass filter 124-1 through 124-*n* will appear on the output terminal 125-1 through 125-*n* of the corresponding bandpass filter. The output of each bandpass filter 124-1 through 124-*n* is thus the fundamental signal at the pass frequency $f_1$ through $f_n$, respectively, of the signal applied thereto. Since stressing variations are imposed upon the test pulse stream generated by decision circuit 106 at only the frequency of audio source 112-1 through 112-*n* to which switch 113 is connected, a signal will be present at only the terminal 125-1 through 125-*n* of that bandpass filter 124-1 through 124-*n* having the corresponding pass frequency $f_1$ through $f_n$. Thus, a signal will be present at only the output of that bandpass filter corresponding to the regenerator under test. Since the test pulse stream generated by decision circuit 106** is stressed at only the frequency at which the regenerator under test is responsive, the output of the bandpass filter connected to the regenerator being tested is determined by the time-varying average of the regenerated test pulse stream.

Figure 2E:
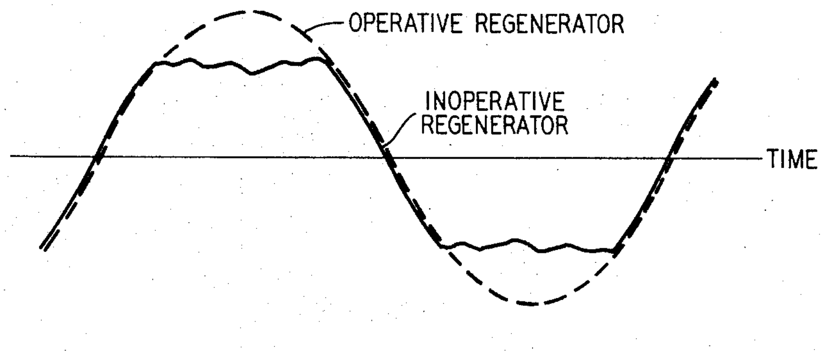
FIG. 2E illustrates the time-varying average outputs of operative and faulty regenerators.

FIG. 2E illustrates the waveforms occurring at the output of the lowpass filter of a test branch when the associated regenerator is operative and when the regenerator is faulty. As hereinabove noted, the output of the lowpass filter connected to the regenerator under test is equal to the time-varying average of the regenerated pulse test stream. The anticipated signal from an operative regenerator will thus be proportional to the stressing signal $s(t)$ and will, in the case illustrated, approximate the sinusoid shown by the dashed curve in FIG. 2E. A faulty regenerator, however, will "break" as shown by the solid curve of FIG. 2E at the peaks of the sinusoidally varying stressing signal, thereby regenerating many of the received digital levels having the higher rate of occurrence as the level having the lower rate of occurrence. Thus, the time average output of a faulty regenerator will have an absolute average maximum amplitude below the anticipated maximum amplitude.

Figure 2F:
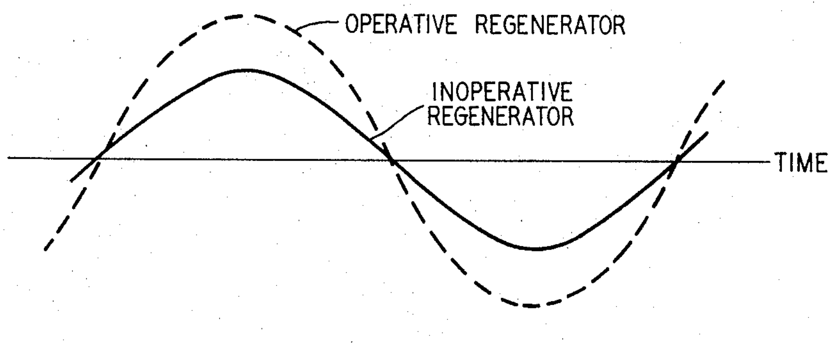
FIG. 2F illustrates the narrow pass-band filtered average outputs of operative and faulty regenerators.

FIG. 2F illustrates the responses of the corresponding bandpass filter to the outputs of the lowpass filter illustrated in FIG. 2E. As shown by the dashed curve in FIG. 2F, the output of the bandpass filter generated in response to the sinusoidal signal derived from an operative regenerator is a sinusoidal signal proportional to the applied signal. The output of the bandpass filter generated in response to the "broken" sinusoidal signal derived from an inoperative regenerator, as shown by the solid curve in FIG. 2F, will be a sinusoidal signal having a magnitude determined by the fundamental component of the applied signal. Therefore, the maximum signal amplitude at the output of a bandpass filter connected in the test branch of a faulty regenerator under test will be below the maximum signal amplitude anticipated from an operative regenerator.

As stated above, output terminals 125-1 through **125-*n* are connected to bridging amplifiers 127-1 through 127-*n*, respectively, the outputs of the latter being connected to supervisory signal path 135. The bridging amplifiers permit the outputs of the bandpass filters to be connected to one supervisory signal path 135. The output signal of the bandpass filter connected to the regenerator being tested is returned over supervisory signal path 135 to a detector 131 in fault locate test set 102. By comparing the maximum value of the signal returned from the bandpass filter with an anticipated maximum signal magnitude, the latter determined by the absolute magnitude of the stressing of the test pulse stream, the regenerator under test is determined to be operative or faulty by detector 131**.

Various other modifications of this invention can be made without departing from the spirit and scope of the present invention. For example, the feedback loop comprising lowpass filter 110, signal combiner 111 and amplifier 117 could be eliminated if, before being directly applied to signal combiner 104, the external stressing signal $s(t)$ is functionally modified to vary the mean of the noise in the appropriate manner to impose upon the statistics of the output pulse stream of decision circuit 106 the frequency and amplitude variations of $s(t)$. Furthermore, this invention is not limited to a noise source having a Gaussian amplitude distribution. Also, this invention is not limited to the generation of polar binary test streams.

The above-described arrangement is illustrative of the application of the principles of the invention. Other embodiments may be devised by those skilled in the art without departing from the spirit and scope thereof.

What is claimed is:

1. A method for testing a pulse regenerator comprising the steps of generating a noise voltage having random voltage fluctuations, perturbing the mean of said noise voltage in a predetermined manner, applying to said regenerator at a fixed repetition rate at test instants random sequences of successive first test pulse levels and second test pulse levels, the probability that the first test pulse level being applied at a test instant and the probability that the second test pulse level being applied at said test instant being functionally determined by the mean of the perturbed noise voltage, deriving at the pulse regenerator a response to the successively applied random test pulse levels, comparing the derived response with an anticipated response to determine whether said regenerator is faulty, said anticipated response being determined by the predetermined manner in which the mean of the noise voltage is perturbed.

2. A method for testing a pulse regenerator comprising the steps of generating a noise voltage having random voltage fluctuations, perturbing the mean of said noise voltage in a predetermined manner, comparing at fixed clock instants the perturbed noise voltage with a predetermined threshold, applying to said regenerator a first test pulse level at each clock instant when the perturbed noise voltage is greater than said predetermined threshold and a second test pulse level at each clock instant when said perturbed noise voltage is less than said predetermined threshold, deriving at the pulse regenerator a response to the successively applied test pulse levels, comparing the derived response with an anticipated response to determine whether said regenerator is faulty, said anticipated response being determined by the predetermined manner in which the mean of the noise voltage is perturbed.

3. A method for locating a faulty one of a plurality of pulse regenerators connected in tandem in a digital transmission system between a transmitting and receiving terminal by selectively testing each of said pulse regenerators, each of said pulse regenerators including means responsive to a unique audio frequency, said method comprising the steps of generating a noise voltage having random voltage fluctuations, recursively perturbing the mean of said noise voltage in a predetermined manner at the audio frequency at which the means of the pulse regenerator under test is uniquely responsive, comparing at fixed clock instants the perturbed noise voltage with a predetermined threshold, transmitting from said transmitting terminal on said transmission system a first test pulse level at each clock instant when said perturbed noise voltage is greater than said predetermined threshold and a second test pulse level at each clock instant when said noise voltage is less than said predetermined threshold, deriving at the pulse regenerator being tested a response to the successively transmitted pulse levels at the frequency at which the mean of said noise voltage is being perturbed, comparing the derived response with an anticipated response to determine whether the regenerator being tested is faulty, said anticipated response being determined by the predetermined manner in which the mean of the noise voltage is perturbed.

4. Apparatus for generating a test signal comprising a noise source for generating an output noise voltage having random voltage fluctuations, a signal source for generating a stressing signal having predetermined amplitude variations at a predetermined audio frequency, means for perturbing the mean of the output noise voltage generated by said noise source with a predetermined amplitude characteristic in response to and at the frequency of said stressing signal, a clock circuit having a pulse repetition rate substantially greater than the frequency of said stressing signal, and pulse generation means for generating in response to said perturbed noise voltage a random test pulse stream having first and second pulse levels at the repetition rate of said clock circuit, the predetermined amplitude characteristic at which the mean of said noise voltage is perturbed being chosen such that the time-varying difference between the probability that the first pulse level is generated and the probability that the second pulse level is generated by said pulse generation means at each clock instant has the predetermined amplitude variations and frequency of the stressing signal.

5. Apparatus for generating a test signal comprising a noise source for generating an output noise voltage having random voltage fluctuations, a clock for generating clock pulses, a decision circuit having an input and output terminal for generating at the output terminal in response to a clock pulse a first test pulse level when a signal at said input terminal is above a predetermined threshold and a second test pulse level when the signal at said input terminal is below said predetermined threshold, a signal source for generating a stressing signal having predetermined amplitude variations at a frequency substantially below the frequency of said clock circuit, and means for combining said output noise voltage and said stressing signal to develop a noise signal at the input terminal of said decision circuit with a mean voltage that varies with a predetermined amplitude characteristic, the amplitude characteristic being chosen such that the test pulse levels generated at the output terminal of said decision circuit have an average value that has the predetermined amplitude variations and frequency of the stressing signal.

6. Apparatus for generating a test signal for use in locating a faulty one of a plurality of pulse regenerators comprising a noise source for generating an output noise voltage having random voltage fluctuations, a clock circuit for generating a clock pulse, a decision circuit having an input and output terminal for generating at the output terminal in response to a clock pulse a first test pulse level when a signal at said input terminal is above a predetermined threshold and a second test pulse level when the signal at said input terminal is below said predetermined threshold, a signal source for generating a stressing signal having predetermined amplitude variations at a frequency substantially below the frequency of said clock circuit, averaging means connected to the output terminal of said decision circuit for generating a signal proportional to the time-varying average of the test pulse levels generated by said decision circuit, first combining means for combining said stressing signal and the output of said averaging means to form a signal having amplitude variations at the frequency of said stressing signal, second combining means connected to said noise source and the output of said first combining means for combining said output noise voltage with the signals combined by said first combining means to develop a noise signal at the input of said decision circuit with a mean voltage that varies with the amplitude variations and at the frequency of the signal at the output of said first combining means, wherein the time-varying difference between the probability that the decision circuit will generate the first test pulse level and the probability that the decision circuit will generate the second test pulse level at each clock instant has the predetermined amplitude variations and frequency of the stressing signal.

* * * * *